United States Patent
Momoo et al.

[11] Patent Number: 5,946,137
[45] Date of Patent: Aug. 31, 1999

[54] OPTICAL INFORMATION PROCESSING UNIT

[75] Inventors: Kazuo Momoo; Tetsuo Saimi, both of Osaka, Japan

[73] Assignee: Matsushita Electric Industrial Co., Ltd., Japan

[21] Appl. No.: 08/600,487

[22] Filed: Feb. 13, 1996

[30] Foreign Application Priority Data

Feb. 14, 1995 [JP] Japan .................................. 7-025333

[51] Int. Cl.[6] .............................. G02B 5/18; G02B 5/32; G11B 7/00
[52] U.S. Cl. ......................... 359/569; 359/566; 359/19; 369/103; 369/109; 369/44.14; 369/44.11
[58] Field of Search ..................................... 359/565, 566, 359/568, 572, 19, 569; 369/109, 112, 44.12, 44.16, 103, 44.11, 44.14

[56] References Cited

U.S. PATENT DOCUMENTS

| | | | |
|---|---|---|---|
| 4,491,940 | 1/1985 | Tinet | 364/46 |
| 4,945,529 | 7/1990 | Ono et al. | 359/566 |
| 4,983,017 | 1/1991 | Tsuji et al. | 359/566 |
| 5,029,154 | 7/1991 | Sumi et al. | 369/112 |
| 5,065,380 | 11/1991 | Yokota | 369/44.12 |
| 5,113,386 | 5/1992 | Whitehead et al. | 369/44.41 |
| 5,442,480 | 8/1995 | Swanson et al. | 359/565 |
| 5,502,707 | 3/1996 | Komma et al. | 359/572 |

FOREIGN PATENT DOCUMENTS

| | | |
|---|---|---|
| 2-192031 | 7/1990 | Japan . |
| 2-193344 | 7/1990 | Japan . |

*Primary Examiner*—Thong Nguyen
*Assistant Examiner*—Audrey Chang
*Attorney, Agent, or Firm*—McDermott, Will & Emery

[57] ABSTRACT

In the system of an optical head which conducts recording, reproducing and erasing, etc. on an optical disk by an optical means, the light from an optical disk is guided to photosensors through a diffraction element comprising of two kinds of diffraction gratings, viz. a first and a second diffraction gratings, each made of a partial area of respective zone plates, disposed approximately rectangular to each other; and then, the SSD method focusing error signal is provided from a diffracted light comming from one of the diffraction gratings, while the Far-Field method tracking error signal from the other diffracted light comming from the remaining diffraction grating; thereby a compact high-performance optical head is implemented at low cost.

8 Claims, 4 Drawing Sheets

← A

↑ B

OPTICAL INFORMATION PROCESSING UNIT

BACKGROUND OF THE INVENTION

The present invention relates to the optical constitution of an optical head in an optical information processing unit for recording, reproducing, erasing the information signals such as data, image, sound, etc.

In order to obtain the focusing error signal and the tracking error singnal from the optical head, various methods have been made public using a beam splitter, a cylindrical lens, etc. An example of the methods utilizing such technique is described in Japanese Patent Laid-Open No. 2-193344, the operating principle of which is explained hereunder in its outline.

An example of prior art constitution is illustrated in FIG. 7(a), FIG. 7(b) and FIG. 7(c); where, FIG. 7(b) and FIG. 7(c) are the views as seen in the direction A and direction B, respectively, indicated in FIG. 1(a). The light emitted from a semiconductor laser 101, being an example of light source, goes through a collimating lens 102, a beam splitter 103, an object lens 104, to be condensed on an optical disk 105. The light reflected by optical disk 105 is reflected by beam splitter 103, and goes to a beam splitter 108 through a wave plate 106 and a single lens 107. The light reflected by beam splitter 108 is separated into light 111 and light 112, each of which goes to a photosensor 110 through a beam splitter 109. Light 111 goes to a detector 113 on photosensor 110 through beam splitter 109. Light 112 is separated into light 112a and light 112b at beam splitter 109, and both lights go to a detector 114 on photosensor 110.

The focusing error signal is detected by the SSD(Spot Size Detection) method, the operating principle of which method is described in detail in the specification of Japanese Patent Laid-Open No. 2-192031. Outline of the method is that the focusing is obtained by controlling the spot sizes of light 112a and light 112b, which takes a light path different from that of light 112a, on detector 114 to be equal.

The tracking error signal is detected by the Far-Field method, the operating principle of which method is described in detail in U.S. Pat. No. 4,491,940. Outline of the method is that the tracking is controlled by detecting the intensity variation caused by interference of the zero order beam reflected by optical disk 105 and the +1 order beam diffracted by optical disk 105.

The above described prior art constitution has drawbacks that the cost of manufacturing an optical head inevitably goes high and the designing of a compact, light-weight and simple-structured optical head is blocked because of the use of an expensive, and bulky, beam splitter and other optical elements as the constituent component.

SUMMARY OF THE INVENTION

The present invention solves the above described drawbacks, and aims to offer an optical head that is compact, and low-cost, yet provides a high performance.

The optical information processing unit according to the present invention is an optical information processing unit in which the light from a light source is guided to an information recording medium for performing at least one of the functions among recording, reproducing and erasing of information on said information recording medium; which comprises a photosensor for detecting light from said information recording medium, and a diffraction element disposed in the light path towards said photosensor for diffracting said light, wherein said diffraction element is consisting of a first diffraction grating and a second diffraction grating disposed approximately rectangular to each other.

By making use of the diffracted light from such diffraction element, the present invention enables to design a simple-structured optical head and offer a high-performance optical head in compact body at low cost.

DESCRIPTION OF THE PREFERRED EMBODIMENTS

Figure 1A:
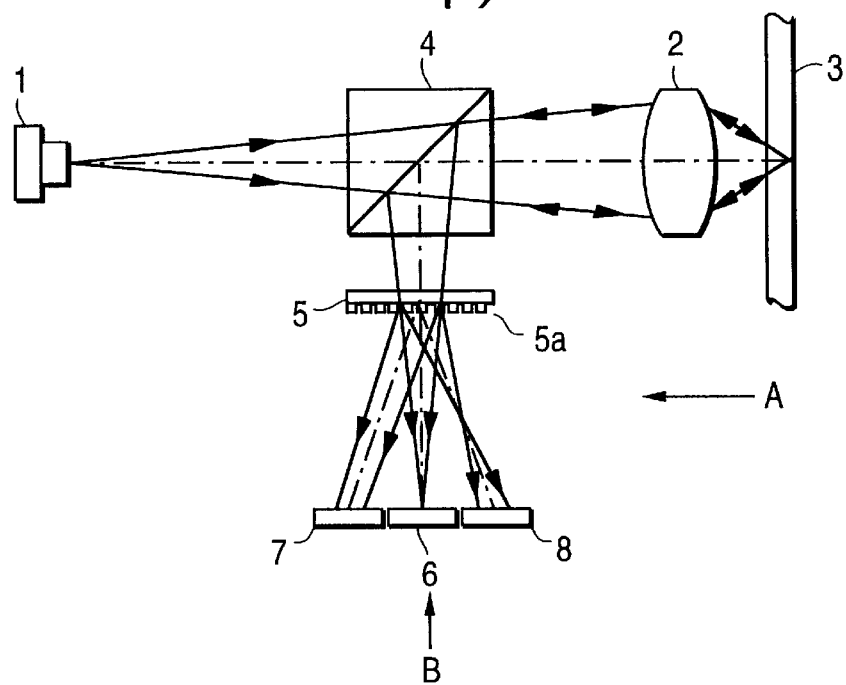
FIG. 1(a) shows basic optical structure of a first embodiment of the present invention.
Figure 1B:
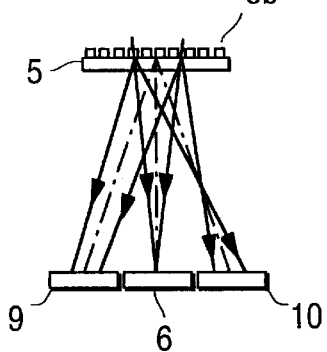
FIG. 1(b) and FIG. 1(c) are the views as seen in the direction A and the direction B, respectively, indicated in FIG. 1(a).

FIG. 1 shows an exemplary constitution of a first embodiment of the present invention. The light emitted from a semiconductor laser, being an example of light source, goes through a beam splitter 4 and then condensed by an object lens 2 on an optical disk 3, being an information recording medium. In this embodiment, the track of optical disk is presumed to be running in a direction perpendicular to the paper sheet, to make explanation simple. However, the direction of track is not limited to the above mentioned angle. The light reflected by optical disk 3 is reflected at beam splitter 4 and diffracted by a diffaction element 5, and then proceeds to photosensors 6, 7, 8, 9 and 10. On the front and the reverse surfaces of diffraction element 5 are a first diffraction grating 5a and a second diffraction grating 5b placed approximately rectangular to each other. At the first diffraction grating and the second diffraction grating, the light is diffracted in directions approximately rectangular to each other. In order to avoid the complication to be caused when all these were illustrated on a drawing at a same time, the diffracted lights are shown divided in separate FIGS. the lights diffracted at the first diffraction grating 5a are shown in FIG. 1(a), and the ones diffracted at the second diffraction grating in FIG. 1(b). At the diffraction grating, the diffracted lights higher than ±2 order are also produced, however these diffracted lights give no direct contribution to the constitution of the present invention. Therefore, description of these are omitted for the sake of simplification.

Figure 2A:
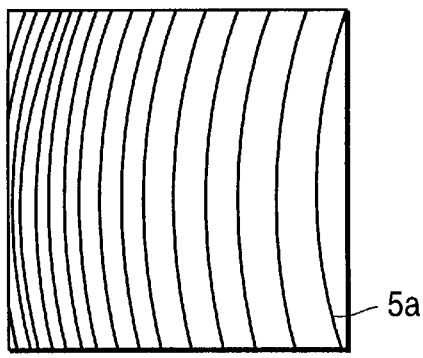
FIG. 2(a) is a typified illustration of the front surface of diffraction grating in the first embodiment.
Figure 2B:
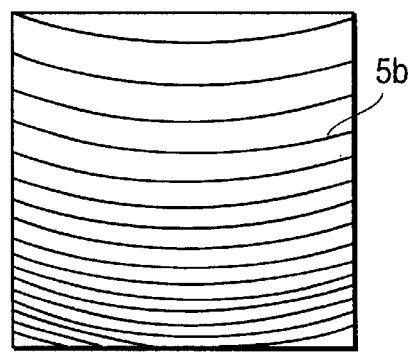
FIG. 2(b) the reverse surface.

FIG. 2(a) is a conceptual drawing of the first diffraction grating 5a, and FIG. 2(b) the second diffraction grating 5b. In the first and the second diffraction gratings, their directions are approximately rectangular to each other, while the radius of curvature and the spacing are usually different depending on the spot diameter and the spot location on the photosensor. The diffraction gratings make use of zone plates in their partial area. Therefore, as illustrated in FIG. 1(a) and FIG. 1(b), the focus positions of +1 order diffracted beam and −1 order diffracted beam with respect to the direction of optical axis differ, and the focusing error signal and the tracking error signal are obtained from these diffracted lights.

Figure 1C:
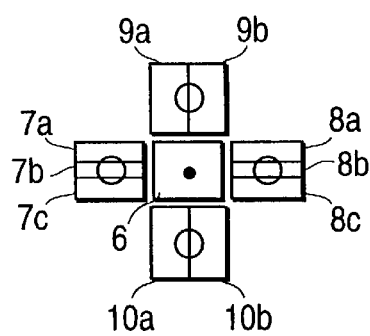

The focusing error signal is detected by the SSD method, the operating principle of the method remains the same as in the prior arts, and description of which method is omitted. In this embodiment where the photosensors are formed as shown in FIG. 1(c), the focusing error signal is obtained through the operation of the outputs of photosensors by a formula (7a+7c+8b)−(8a+8c+7b), or a formula 7b−8b.

The tracking error signal is detected by the Far-Field method, the operating principle of the method remains the same as in the prior arts, and description of which is omitted. In this embodiment, the tracking error singnal is obtained through the operation of the outputs of photosensors by a formula 9a−9b, or a formula 10a−10b, or a formula (9a+10b)−(9b+10a).

The information signal is obtainable from either the photosensor 6, the sum of photosensor 7 and photosensor 8, the sum of photosensor 9 and photosensor 10, or the sum of photosensors 6, 7, 8, 9 and 10, or from others.

As described above, according to the present embodiment, the focusing error signal, the tracking error signal and the information signal are obtained by means of a flat-shaped diffraction element 5, without necessitating the use of any other complicated optical elements. This enables to make the optical head smaller and simpler. The photosensors 6 through 10 may be constituted independently, however it is of course preferred to constitute these on a same substrate as a single unit. The areas of diffraction gratings 5a, 5b should preferably be larger than the incomming light flux, in other words the diameters of diffraction gratings 5a, 5b should preferably be larger than the diameter of light flux.

Figure 3:
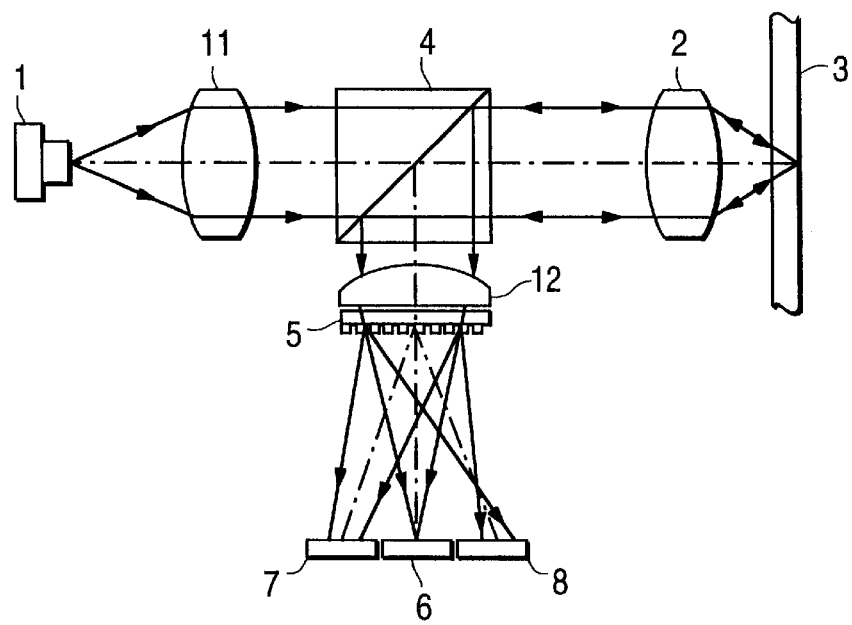
FIG. 3 shows basic optical structure of a second embodiment of the present invention.

FIG. 3 shows a second embodiment of the present invention. In the constitution as illustrated in FIG. 1 the utilization rate of the light from a semiconductor laser 1 is low. In order to raise the rate of light utilization, the second embodiment employs a collimating lens 11 for supplying parallel light to beam splitter 4. In this case, a condensing element 12 is disposed between beam splitter 4 and diffraction element 5 for concentrating the light on the photosensors.

Although the condensing element 12 is placed between beam splitter 4 and diffraction element 5 in FIG. 3, it may of course be placed between diffraction element 5 and photosensors. The pattern of lights diffracted at diffraction element 5 going into photosensors 6 through 10 remain the same as in FIG. 1, therefore the portion overlapped with which is eliminated in FIG. 3. The principle for obtaining the error signals and information signal is the same as in the first embodiment. In this constitution, by the use of condensing element 12 and diffraction element 5, an optical head is easily implemented in which the efficiency of light utilization is higher than in the first embodiment; which optical head of course shares the same advantages as those of the first embodiment.

Figure 4:
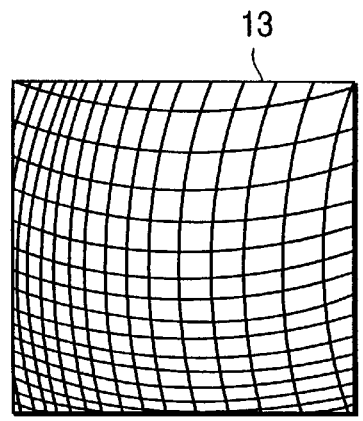
FIG. 4 is a typified illustration of diffraction grating in a third embodiment of the present invention.

FIG. 4 shows a diffraction element 13 as a third embodiment of the present invention. While the diffraction element in FIG. 1 is provided with diffraction grating 5a and diffraction grating 5b, respectively, on respective surfaces of the element, the diffraction element 13 takes a form of multiple hologram bearing two kinds of diffraction gratings on either one of the two surfaces. The diffraction element 13 functions as a diffraction element in exactly the same way as the diffraction element 5; however the former diffraction element has an advantage that the cost is lower, because it can be manufactured on a simplified procedure of etching or molding, etc. taking advantage of a fact that the diffraction grating is provided only on one of the both surfaces.

Figure 5:
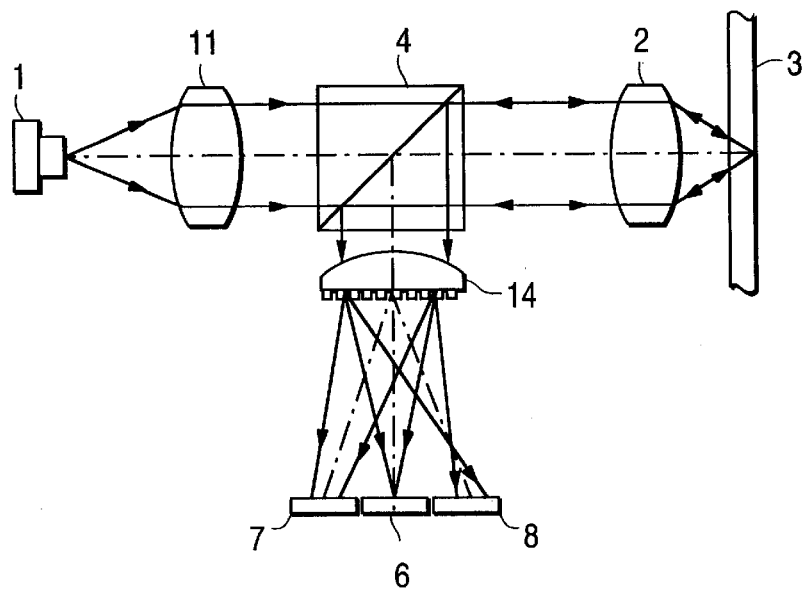
FIG. 5 shows basic optical structure of a fourth embodiment of the present invention.

FIG. 5 shows a fourth embodiment of the present invention. In a diffraction element 14, one of the light transmitting surfaces is spherical and the other surface is flat, and the two kinds of diffraction gratings as illustrated in FIG. 4 are provided on the latter surface in a form of multiple hologram. Because of the shape of a plano-convex lens, the diffraction element 14 itself plays the roles of the condensing element 12 and the diffraction element 5 of the second embodiment together. This embodiment works on the same operating principle as in the first and the second embodiments, so the description of which principle is eliminated here. In this constitution, the condensing element and the diffraction element are provided as a single component, which helps implementing a low cost optical head with less number of constituent components. This brings about a substantial advantage. Although in this embodiment the shape of diffraction element 14 is described as a plano-convex lens, it is not limited to this shape; a convex-convex lens, an aspherical lens or others may also be used for the same purpose in so far as it has a light condensing function. Although in this embodiment the diffraction grating is provided on the flat surface of diffraction element 14, the diffraction grating can easily be formed on the spherical surface by means of press molding, etc.; the latter of course serve the same purpose.

Although descriptions in the above embodiments are made with the light reflected by an optical disk, it is not the intention of the present invention to be limited to the reflected light; a transmission type optical head may of course produce an outstanding advantage by adopting a same constitution.

Figure 6A:
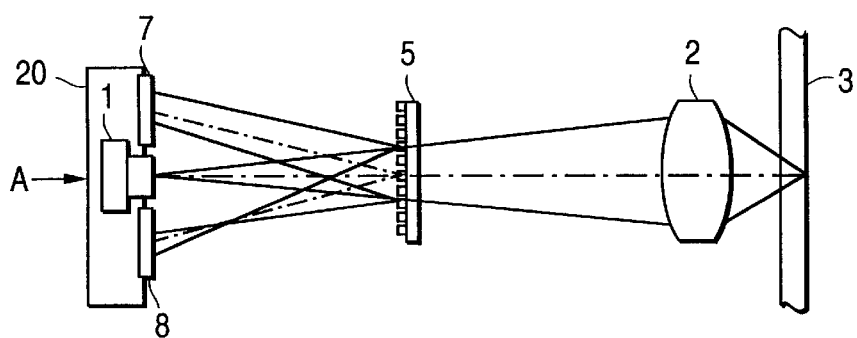
FIG. 6(a) shows basic optical structure of a fifth embodiment of the present invention.
Figure 6B:
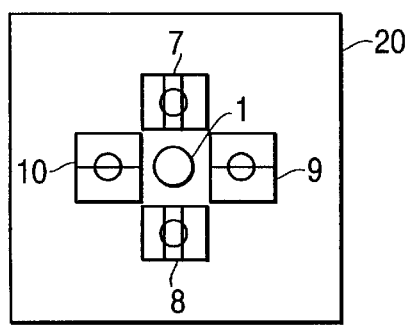
FIG. 6(b) is the view as seen in the direction A indicated in FIG. 6(a).
Figure 7A:
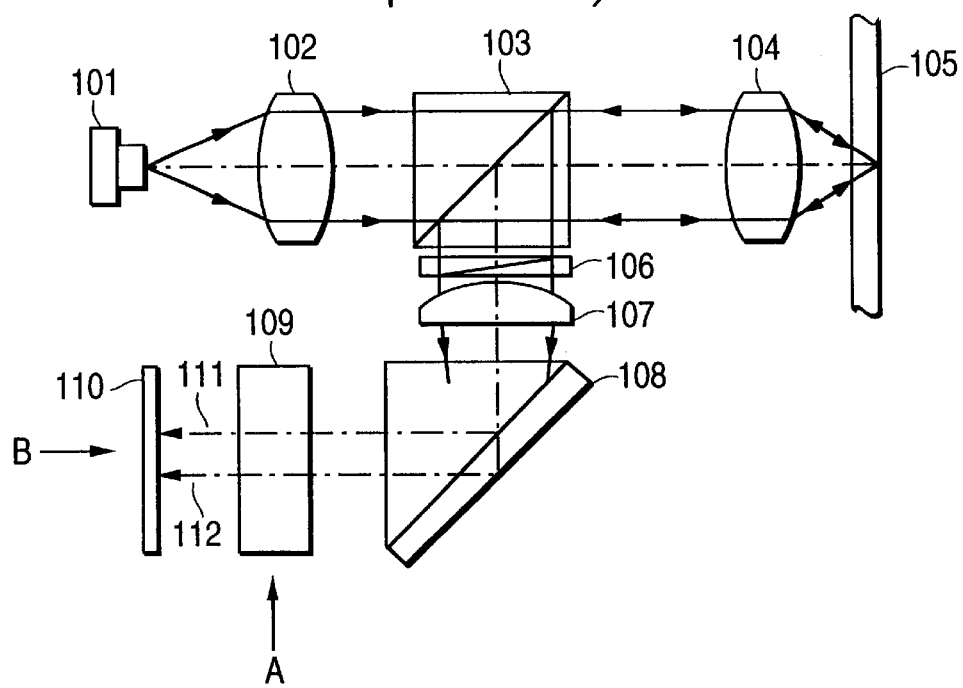
FIG. 7(a) shows a prior art optical structure.
Figure 7B:
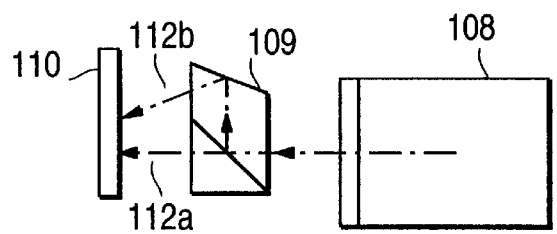
FIG. 7(b) and FIG. 7(c) are the views as seen in the direction A and the direction B, respectively, indicated in FIG. 7(a).
Figure 7C:
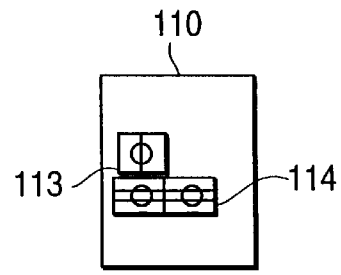

FIG. 6 illustrates a fifth embodiment of the present invention. A diffraction element 5 is placed in the light path between a semiconductor laser 1 and an optical disk 3. The light diffracted at diffraction element 5 come into photosensors 7 through 10 disposed around semiconductor laser 1. The operating principle for detecting various signals from the diffracted beams remains the same as in the foregoing embodiments, therefore the description of which principle is eliminated here. As a beam splitter 4 turns out to be unnecessary in the present constitution, an optical head can be made smaller and simpler by a step further.

In a case when the efficiency of light utilization is to be raised under the present constitution, simply add a collimating lens 11 in the same way as in the second embodiment. The collimating lens may be placed in the light path either before or after diffraction element 5. If the collimating lens 11 and the diffraction element 5 are integrated into a single component, an additional advantage is obtainable in making an optical head smaller and simpler. The semiconductor laser 1 and the photosensors 7 through 10 may be constituted separately, however it is of course preferred to have the semiconductor laser 1 and the photosensors 7 through 10 constituted as a single component 20, as illustrated in FIG. 6. Furthermore, the effectiveness of the present invention is expanded for more steps if the semiconductor laser 1 and the diffraction element 5 are integrated as one component.

In the aforementioned embodiments, an optical disk is employed as the information recording medium. However, it is not the intention of the present invention to limit the recording medium to an optical disk; the present invention is applicable, irrelevant to the shape, also to other media such as optical cards in so far as they work on a same principle.

What is claimed is:

1. An optical information processing unit that functions by guiding light from a light source to an information recording medium, comprising:

a photosensor for detecting reflected light from said information recording medium, said reflected light traveling in a light path between the information recording medium and the photosensor; and a diffraction element for diffracting the reflected light, wherein said diffraction element comprises a first diffraction grating and a second diffraction grating placed such that grating lines of the first diffraction grating are approximately rectangular to grating lines of the second diffraction grating, said first and second diffraction gratings each having a diameter larger than a diameter of flux of the reflected light, and said first and second diffraction gratings being spatially overlapped wherein a focusing error signal is detected from both of +1 order and −1 order diffracted lights of one of either diffracted light from the first diffraction grating or diffracted light from the second diffraction grating by a spot size detection method, focus positions of said +1 order and −1 order diffracted lights existing in front of and behind said photosensor, while a tracking error signal is detected from diffracted light from the one of either the first diffraction grating or the second diffraction grating from which the focusing error signal is not detected.

2. The optical information processing unit of claim 1, further comprising a light condensing element disposed in the light path between the information recording medium and the photosensor.

3. The optical information processing unit of claim 1, wherein said first diffraction grating is disposed on the outgoing light surface of said diffraction element, while said second diffraction grating is disposed on the incoming light surface of said diffraction element.

4. The optical information processing unit of claim 1, wherein said diffraction element comprises a multiple hologram with said first and second gratings on a same surface.

5. The optical information processing unit of claim 1, wherein at least one of the light transmitting surfaces of said diffraction element is curved.

6. The optical information processing unit of claim 1, wherein said diffraction element is disposed in a light path between said light source and said information recording medium.

7. The optical information processing unit of claim 6, wherein said light source and said photosensor are constituted to form a single unit.

8. The optical information processing unit of claim 6, wherein said light source and said diffraction element are constituted to form a single unit.

* * * * *